(12) United States Patent
Takahashi et al.

(10) Patent No.: US 9,782,007 B2
(45) Date of Patent: Oct. 10, 2017

(54) HEADREST SUPPORT STRUCTURE

(71) Applicants: TOYOTA JIDOSHA KABUSHIKI KAISHA, Toyota-shi, Aichi-ken (JP); TOYOTA BOSHOKU KABUSHIKI KAISHA, Kariya-shi, Aichi-ken (JP)

(72) Inventors: Gen Takahashi, Nagakute (JP); Akihide Ozaki, Miyoshi (JP)

(73) Assignees: TOYOTA JIDOSHA KABUSHIKI KAISHA, Toyota-shi (JP); TOYOTA BOSHOKU KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 14/905,447

(22) PCT Filed: Jul. 11, 2014

(86) PCT No.: PCT/IB2014/001311
§ 371 (c)(1),
(2) Date: Jan. 15, 2016

(87) PCT Pub. No.: WO2015/008127
PCT Pub. Date: Jan. 22, 2015

(65) Prior Publication Data
US 2016/0166064 A1    Jun. 16, 2016

(30) Foreign Application Priority Data

Jul. 19, 2013   (JP) .................................. 2013-150656

(51) Int. Cl.
*A47C 1/10*   (2006.01)
*A47C 7/36*   (2006.01)
(Continued)

(52) U.S. Cl.
CPC ............ *A47C 7/383* (2013.01); *B60N 2/4808* (2013.01); *A47C 7/36* (2013.01); *B60N 2/48* (2013.01);
(Continued)

(58) Field of Classification Search
CPC ...... B60N 2/4811; B60N 2/4808; B60N 2/48; B60N 2002/4897; B60N 2002/4894;
(Continued)

(56) References Cited

U.S. PATENT DOCUMENTS 5,769,499 A * 6/1998 Dudash ................ B60N 2/4808
                                                         297/391
6,733,079 B2 * 5/2004 Gans .................... B60N 2/4814
                                                         297/410
(Continued)

FOREIGN PATENT DOCUMENTS

EP      1686004 A1    8/2006
FR      2912353 A1    8/2008
(Continued)

*Primary Examiner* — Chi Q Nguyen
(74) *Attorney, Agent, or Firm* — Andrews Kurth Kenyon LLP

(57) ABSTRACT

A headrest support having a hollow cylindrical shape and into which a headrest stay is inserted, is inserted into a bracket that has a hollow cylindrical shape and is fixed to a seat back frame. A protrusion, a tip end of which is a pivot center of the headrest support, formed such that a protrusion amount thereof increases in response to insertion of the headrest stay, is provided on an outer peripheral surface of this headrest support.

9 Claims, 7 Drawing Sheets

(51) Int. Cl.
   *A61G 15/00*  (2006.01)
   *B60R 22/28*  (2006.01)
   *A47C 7/38*  (2006.01)
   *B60N 2/68*  (2006.01)
   *B60N 2/48*  (2006.01)
   *B60N 2/70*  (2006.01)
   *B60N 2/72*  (2006.01)

(52) U.S. Cl.
   CPC ........... *B60N 2/4811* (2013.01); *B60N 2/4826* (2013.01); *B60N 2/4832* (2013.01); *B60N 2/68* (2013.01); *B60N 2/682* (2013.01); *B60N 2/686* (2013.01); *B60N 2/7094* (2013.01); *B60N 2/72* (2013.01); *B60N 2002/4894* (2013.01); *B60N 2002/4897* (2013.01); *B60N 2205/20* (2013.01)

(58) Field of Classification Search
   CPC .. B60N 2/4826; B60N 2/4832; B60N 2/7094; B60N 2/682; B60N 2/68; B60N 2/686; B60N 2/72; A47C 7/36
   USPC .......................................... 297/404, 391, 410
   See application file for complete search history.

(56) References Cited

U.S. PATENT DOCUMENTS

| | | | |
|---|---|---|---|
| 8,109,569 B2* | 2/2012 | Mitchell | B60R 11/0235 297/217.1 |
| 8,348,338 B2* | 1/2013 | Galecka | B60N 2/4808 297/216.12 |
| 2003/0222492 A1* | 12/2003 | Nemoto | B60N 2/4817 297/410 |
| 2004/0021360 A1* | 2/2004 | Key | B60N 2/48 297/452.18 |
| 2004/0090103 A1 | 5/2004 | Yamada | |
| 2006/0175888 A1 | 8/2006 | Droche | |
| 2009/0179474 A1* | 7/2009 | Reel | B60N 2/4814 297/391 |
| 2009/0315368 A1* | 12/2009 | Mitchell | B60R 11/0235 297/188.04 |
| 2010/0194167 A1* | 8/2010 | Gans | B60N 2/4817 297/410 |
| 2011/0248540 A1* | 10/2011 | Yamada | B60N 2/4802 297/391 |
| 2012/0025582 A1* | 2/2012 | Humer | B60N 2/482 297/391 |
| 2012/0025583 A1* | 2/2012 | Yamada | B60N 2/4808 297/391 |
| 2012/0200135 A1* | 8/2012 | Muto | B60N 2/4823 297/410 |
| 2013/0076095 A1* | 3/2013 | Nakata | B60N 2/4808 297/410 |
| 2014/0145486 A1* | 5/2014 | Wisniewski | B60N 2/4808 297/391 |
| 2015/0145308 A1* | 5/2015 | Takahashi | B60N 2/48 297/404 |
| 2015/0165945 A1* | 6/2015 | Takahashi | B60N 2/4808 297/404 |
| 2015/0210194 A1* | 7/2015 | Furuta | B60N 2/48 297/391 |
| 2016/0166064 A1* | 6/2016 | Takahashi | B60N 2/4808 297/404 |

FOREIGN PATENT DOCUMENTS

| | | |
|---|---|---|
| JP | S61-149552 U | 9/1986 |
| JP | 2014-104849 A | 6/2014 |

\* cited by examiner

FIG. 2A
FIG. 2B
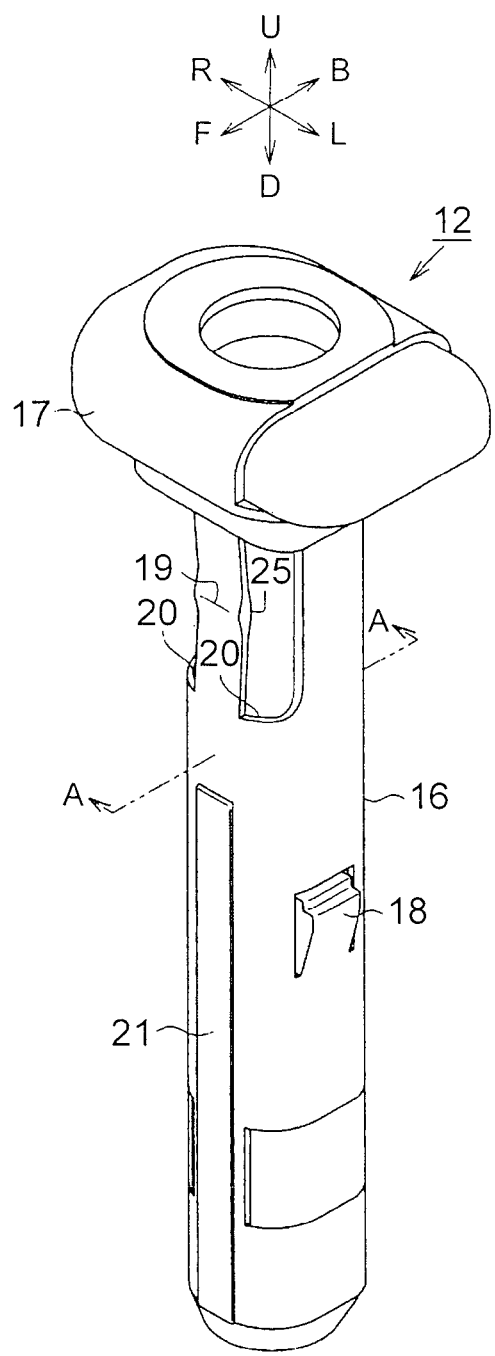
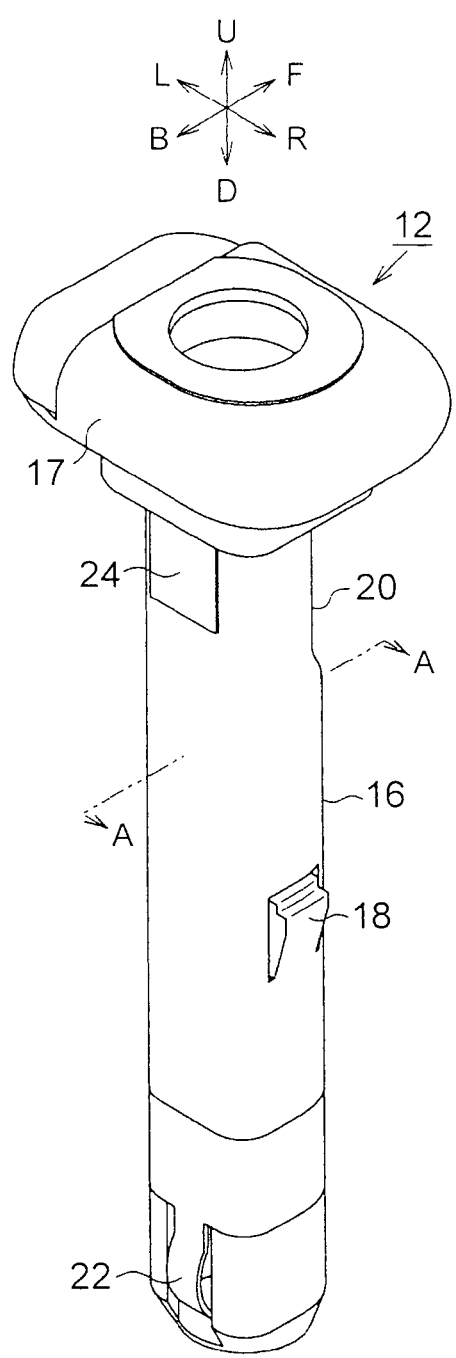

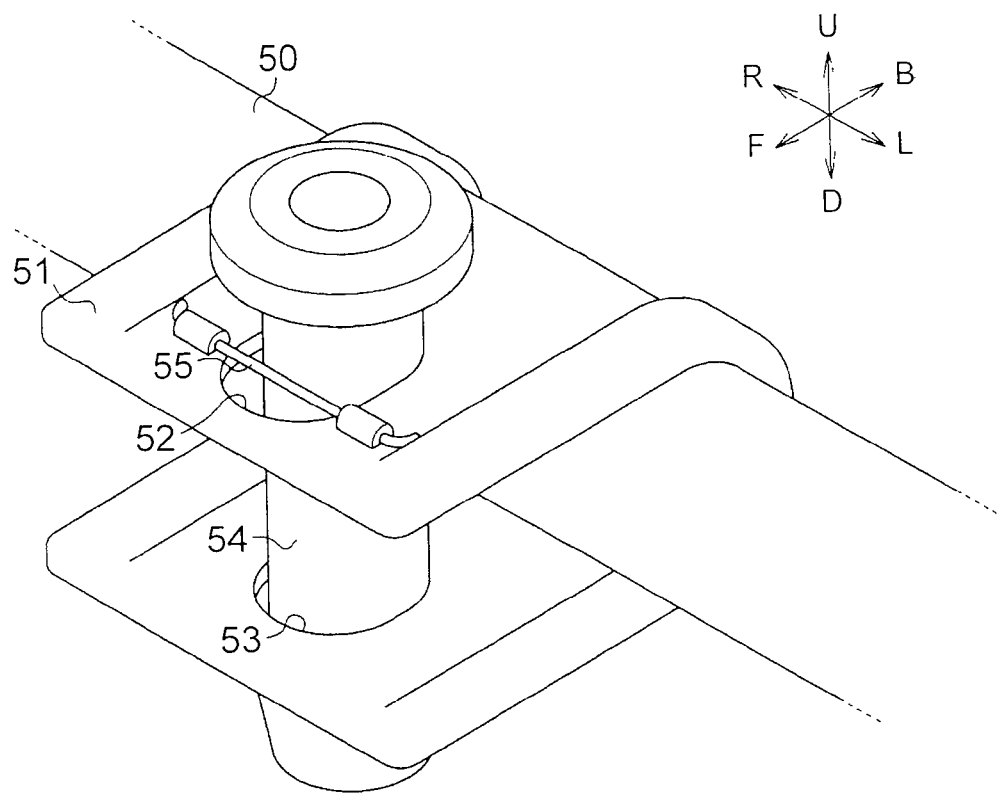

HEADREST SUPPORT STRUCTURE

CROSS-REFERENCE TO RELATED APPLICATIONS

This is a national phase application based on the PCT International Patent Application No. PCT/IB2014/001311 filed Jul. 11, 2014, claiming priority to Japanese Patent Application No. 2013-150656 filed Jul. 19, 2013, the entire contents of both of which are incorporated herein by reference.

BACKGROUND OF THE INVENTION

1. Field of the Invention

The invention relates to a headrest support structure that pivotally supports a headrest.

2. Description of Related Art

One known headrest support structure makes a headrest serve as a dynamic damper by pivotally elastically-supporting the headrest on a seat back. The support structure described in Japanese Utility Model Application Publication No. 61-149552 (JP 61-149552 U), for example, is one such headrest support structure.

FIG. 7 is a view of the structure of a headrest support structure described in JP 61-149552 U. This headrest support structure has a bracket 51 that is fixed to a seat back frame 50 that is a frame member of a seat back. The bracket 51 is formed by a metal plate member that is bent in a general sideways U-shape. Through-holes 52 and 53 are formed in an upper portion and a lower portion, respectively, of this bracket 51. Headrest supports 54 that are made of resin and support headrest stays are inserted into these through-holes 52 and 53. The through-hole 52 formed in the upper portion of the bracket 51 is a slotted hole that is long in a seat front-rear direction. A wire-like spring 55 that is made of metal extends across a portion that is toward the seat front.

With this kind of headrest support structure, the headrest supports 54 is allowed to pivot ever so slightly with respect to the bracket 51 while being elastically supported. Therefore, with a seat in which the headrest is supported by this kind of support structure, the headrest serves as a dynamic damper that reduces seat vibrations by resonance vibration of the headrest.

When the headrest is used as a dynamic damper, the damper property of the headrest needs to be appropriately set such that the resonance frequency of the headrest matches the frequency of reduced seat vibration. With the headrest support structure according to the related art, unless the fit of the headrest supports 54 in the through-holes 52 and 53 of the bracket 51 is sufficiently tight, the position of the pivot center of the headrest supports 54 with respect to the bracket 51, and thus the position of the pivot center of the headrest, will change, and as a result, the damper property of the headrest will end up changing. However, if the fit of these headrest supports 54 is tight, assembly of the headrest supports 54 into the brackets 51 may be difficult.

Also, even if the headrest is not used as a dynamic damper, when the headrest is pivotally supported on the seat back, a similar problem may occur. That is, if the position of the pivot center of the headrest ends up being offset due to assembly tolerance of the members, the headrest will be unable to pivot as intended. On the other hand, in order to inhibit the position of the pivot center of the headrest from being offset, the fit of the members needs to be tight, but if the fit is tight, assembly of the part may be difficult.

SUMMARY OF THE INVENTION

The invention thus provides a headrest support structure capable of easily and adequately ensuring pivot operation accuracy of a headrest.

A first aspect of the invention relates to a headrest support structure that includes a headrest support having a hollow cylindrical shape, into which a headrest stay is inserted; and a bracket having a hollow cylindrical shape that is fixed to a seat back frame, and into which the headrest support is inserted. The headrest support is pivotally supported with respect to the bracket, around a contact portion between a tip end of a protrusion provided on an outer peripheral surface of the headrest support and an inner peripheral surface of the bracket. The protrusion is formed such that a protrusion amount thereof toward an outer peripheral side of the headrest support increases in response to insertion of the headrest stay.

With this kind of headrest support structure, a protrusion is provided on the outer peripheral surface of the headrest support, and the contact portion between the tip end of this protrusion and the inner peripheral surface of the bracket is a pivot center of the headrest support with respect to the bracket. Therefore, the position of the pivot center of the headrest is stable. Also, when the headrest stay is not inserted, the amount that the protrusion protrudes toward the outer peripheral side of the headrest support is less than it is originally, so interference from the protrusion with respect to the inner peripheral surface of the bracket is inhibited, which enables the headrest support to be inserted more smoothly. Therefore, with this kind of headrest support structure, the pivot operation accuracy of the headrest is able to be easily and adequately ensured.

A second aspect of the invention relates to a headrest support structure that includes a headrest support having a hollow cylindrical shape, into which a headrest stay is inserted; and a bracket having a hollow cylindrical shape that is fixed to a seat back frame, and into which the headrest support is inserted. The headrest support is pivotally supported with respect to the bracket, around a contact portion between a tip end of a protrusion provided on an outer peripheral surface of the headrest support and an inner peripheral surface of the bracket. An inner peripheral surface of the headrest support when the headrest stay is not inserted locally bulges out toward an inner peripheral side of the headrest support, at a location where the protrusion is formed.

With this kind of headrest support structure, a protrusion is provided on the outer peripheral surface of the headrest support, and the contact portion between the tip end of this protrusion and the inner peripheral surface of the bracket is a pivot center of the headrest support with respect to the bracket. Therefore, the position of the pivot center of the headrest is stable. On the other hand, when the headrest stay is inserted, the portion of the inner peripheral surface of the headrest support that locally bulges out is pushed on by the headrest stay, such that the protrusion is pushed out to the outer peripheral side. That is, when the headrest stay is not inserted, the amount that the protrusion protrudes toward the outer peripheral side of the headrest support is less than it is originally. Therefore, interference from the protrusion is able to be inhibited, and thus the headrest support is able to be inserted more smoothly, if the headrest support is inserted into the bracket while the headrest stay is not inserted.

Accordingly, with this kind of headrest support structure as well, the pivot operation accuracy of the headrest is able to be easily and adequately ensured.

If two slits provided in parallel are formed in the headrest support of these headrest support structures so as to sandwich the headrest, the force required to accomplish the deformation of the headrest support that acts to increase the protrusion amount of the protrusion is able to be reduced. Therefore, the headrest stay is also able to be inserted into the headrest support smoothly.

Also, in order to more reliably inhibit interference from the protrusion when the headrest support is inserted, a position of the tip end of the protrusion when the headrest stay is not inserted may be a position in which the tip end of the protrusion does not contact the inner peripheral surface of the bracket when the headrest support is inserted into the bracket and the headrest stay is not inserted.

This headrest support structure may also include an elastic member provided on the headrest support, and this elastic member may elastically support a headrest via the headrest stay.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2A is a perspective view of a perspective structure of a headrest support provided in the headrest support structure of the first example embodiment, and shows the headrest support viewed from a seat front side;

FIG. 2B is a perspective view of a perspective structure of a headrest support provided in the headrest support structure of the first example embodiment, and shows the headrest support viewed from a seat rear side;

FIG. 7 is a perspective view of a headrest support structure according to related art.

DETAILED DESCRIPTION OF EMBODIMENTS

Hereinafter, a first example embodiment of the headrest support structure of the invention will be described in detail with reference to FIGS. 1 to 6. In the description below, a direction corresponding to forward of an occupant seated in a seat will be referred to as "seat front F", a direction corresponding to rearward of the occupant will be referred to as "seat rear B", a direction corresponding to the left of the occupant will be referred to as "seat left L", and a direction corresponding to the right of the occupant will be referred to as "seat right R". Also, a direction to a side where the headrest is positioned when viewed from the seat back will be referred to as "seat upper U" or "above U in the vertical direction of the seat", and a direction opposite this direction will be referred to as "seat lower D" or "below D in the vertical direction of the seat".

Figure 1:
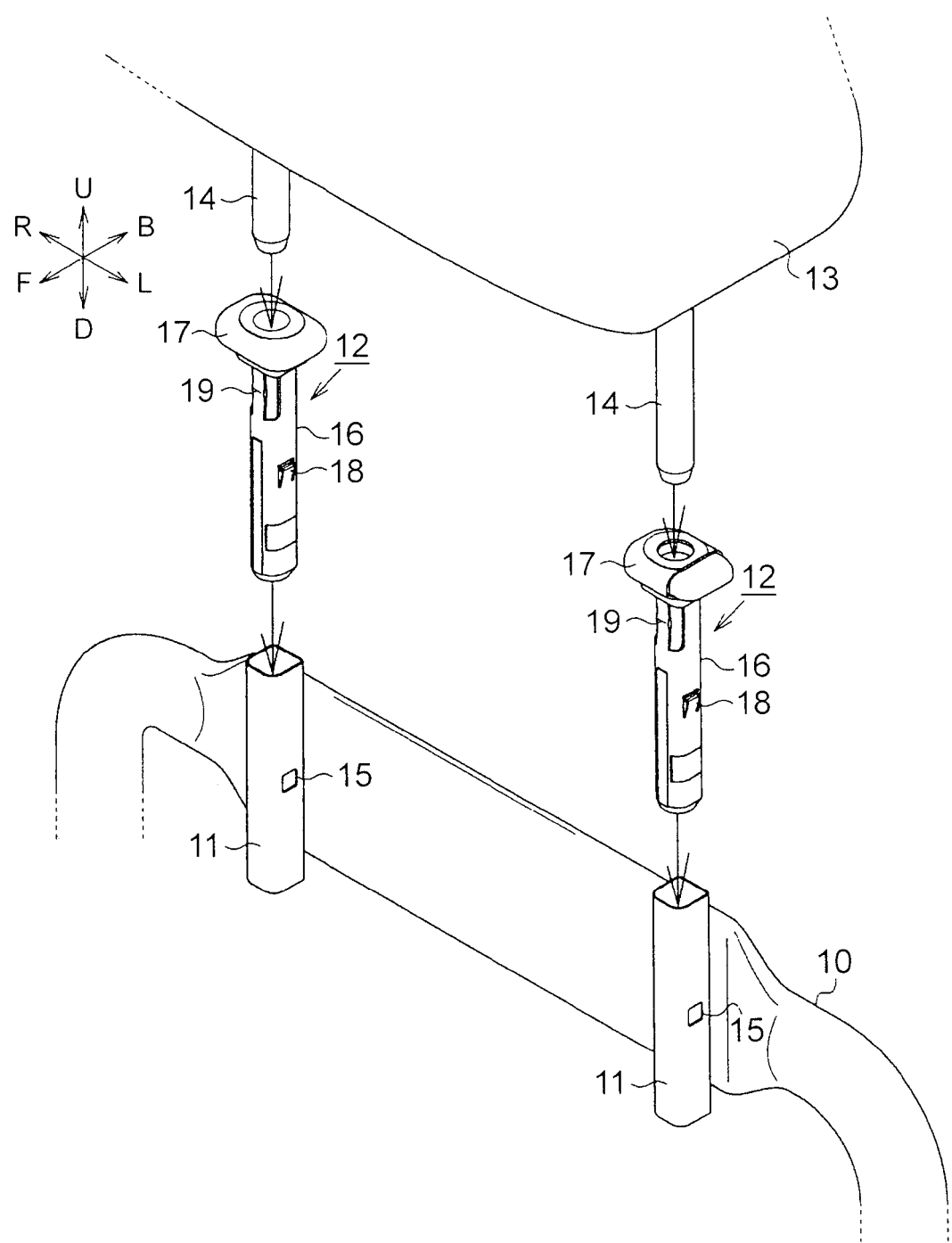
FIG. 1 is an exploded perspective view of an exploded perspective structure of a first example embodiment of a headrest support structure of the invention.

As shown in FIG. 1, the headrest support structure of this example embodiment includes two brackets 11 that are fixed to a seat back frame 10 that forms a frame of a seat back, and two headrest supports 12 that are inserted into these brackets 11. Also, a headrest 13 is supported on the seat back frame 10 by two headrest stays 14 that extend below the headrest 13 being inserted into these headrest supports 12.

Each of the brackets 11 is formed in a hollow cylindrical shape that has a generally square cross-section. Also, each bracket 11 is fixed to a seat upper U portion of the seat back frame 10 by welding or the like. A retaining hole 15 is open in each side surface on a seat left L and a seat right R of each bracket 11.

Each headrest support 12 has a cylindrical portion 16 that is formed in a hollow cylindrical shape that has a generally square cross-section, and that is inserted into the bracket 11, and a head portion 17 formed above this cylindrical portion 16. The cylindrical portion 16 and the head portion 17 are made of resin. The cylindrical portion 16 is integrally formed with the head portion 17.

A pawl 18 that protrudes toward an outer peripheral side is provided on both the side surface of the cylindrical portion 16 on the seat left L and the seat right R. Also, the headrest supports 12 are fixed to the brackets 11 by the pawls 18 engaging with the retaining holes 15 of the brackets 11.

FIG. 2A is a view of the headrest support 12 viewed from the seat front F side. As shown in the drawing, a protrusion 19 that protrudes in a convex shape toward the outer peripheral side of the cylindrical portion 16 is provided on an outer peripheral surface of a seat upper U portion on the seat front F side of the cylindrical portion 16. Also, a bulging portion 25 that bulges out toward the inner peripheral side of the cylindrical portion 16 is provided on a back surface of the protrusion 19, i.e., an inner peripheral surface of the headrest support 12 at the location where the protrusion 19 is formed. Further, two slits 20 provided in parallel are open in the side surface of the cylindrical portion 16 so as to sandwich the protrusion 19.

FIG. 2B is a view of the headrest support 12 viewed from the seat rear B side. As shown in the drawing, a plate spring 22 is provided on a seat lower D portion on the seat rear B side of the cylindrical portion 16. With this headrest support 12, the plate spring 22 is formed as a separate member made of metal, and is fixed in place by fitting into the outer peripheral surface of the cylindrical portion 16.

A protruding bead 21 is formed on the seat front F side at a location corresponding to where the protrusion 19 is formed, on the outer peripheral surface of the cylindrical portion 16. Also, as shown in FIG. 2B, a protruding bead 24 is also formed on the seat rear B side at a location corresponding to where the plate spring 22 is arranged, on the outer peripheral surface of the cylindrical portion 16.

Figure 3:
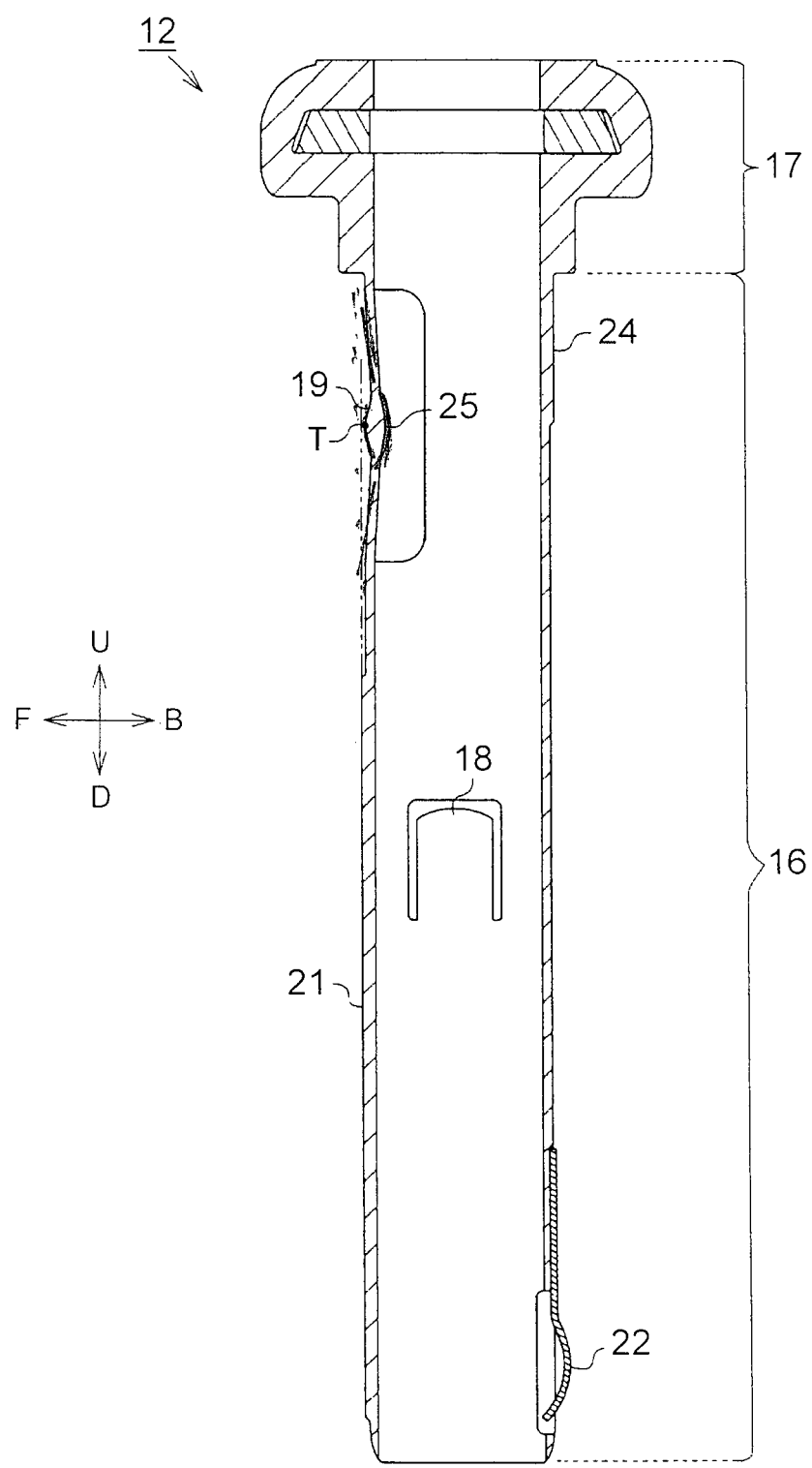
FIG. 3 is a side sectional view of the headrest support taken along line A-A in FIGS. 2A and 2B.
Figure 4:
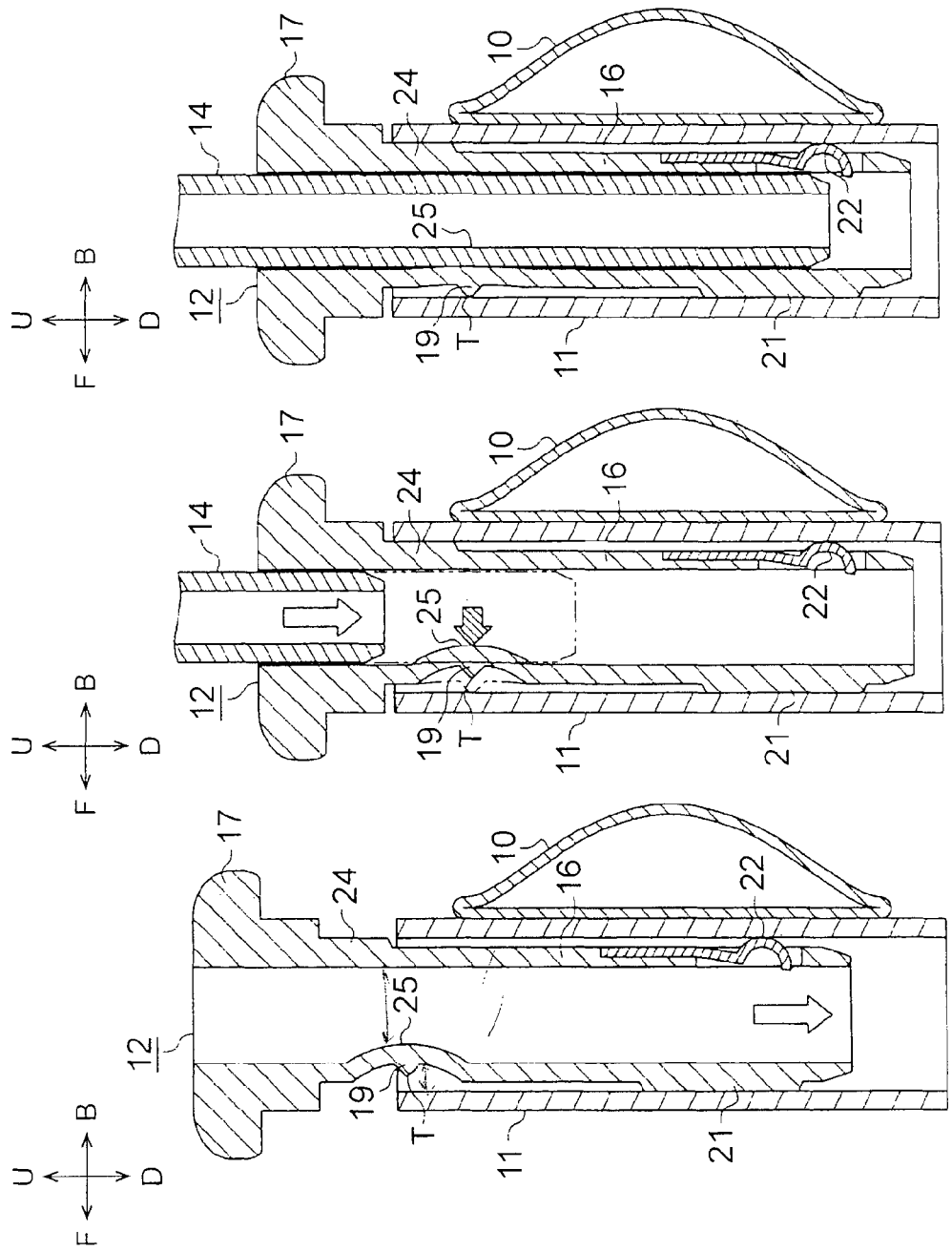
FIG. 4A is a view illustrating an assembly procedure of a headrest in the headrest support structure of the first example embodiment.
FIG. 4B is another view illustrating the assembly procedure of the headrest in the headrest support structure of the first example embodiment.
FIG. 4C is another view illustrating the assembly procedure of the headrest in the headrest support structure of the first example embodiment.
Figure 5:
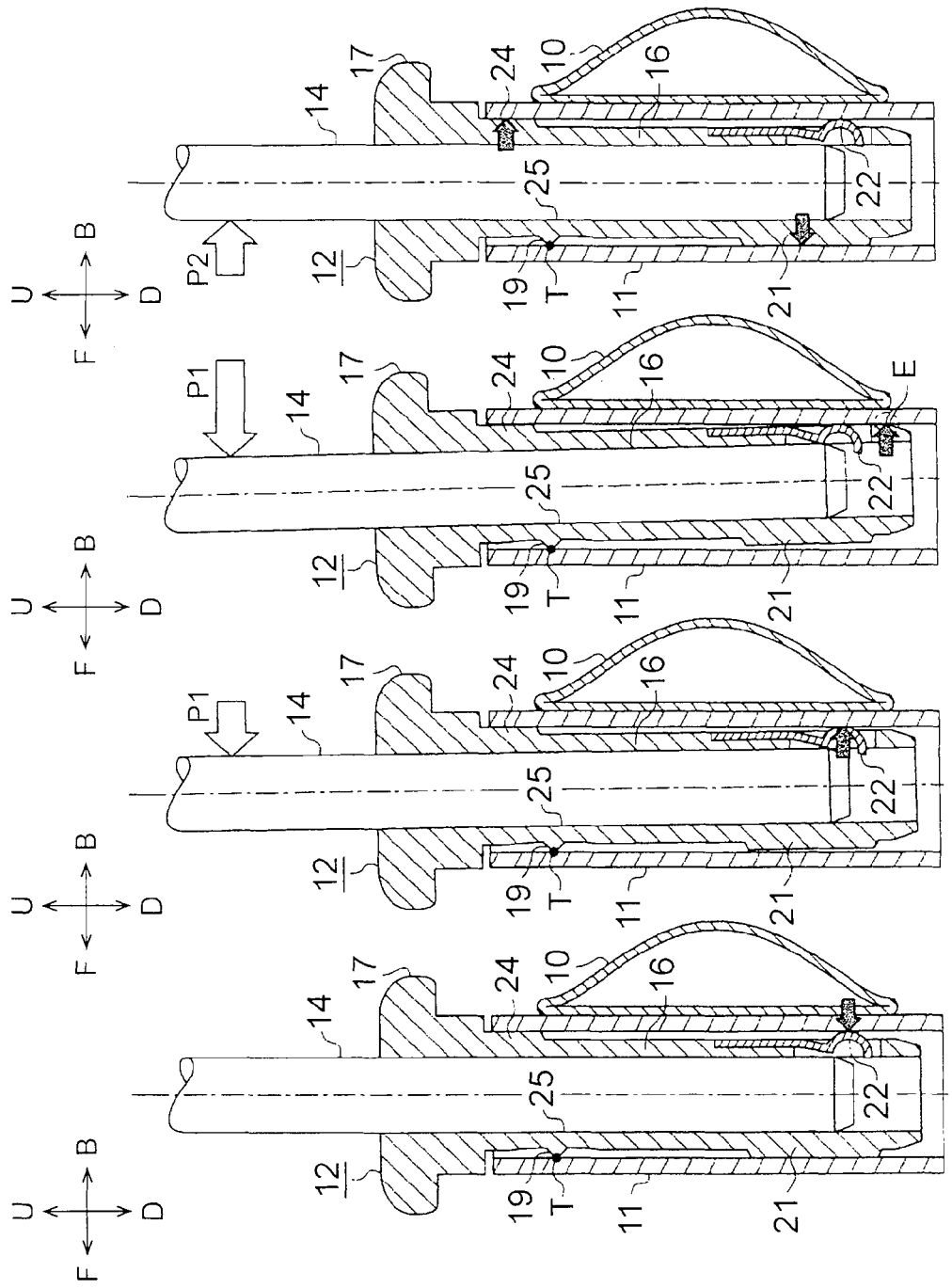
FIG. 5A is a view illustrating the operation of the headrest support structure when force is applied to the headrest.
FIG. 5B is another view illustrating the operation of the headrest support structure when force is applied to the headrest.
FIG. 5C is another view illustrating the operation of the headrest support structure when force is applied to the headrest.
FIG. 5D is another view illustrating the operation of the headrest support structure when force is applied to the headrest.

FIG. 3 is a view of the sectional structure of the headrest support 12 taken along line A-A in FIGS. 2A and 2B when the headrest stay 14 is not inserted. In the drawing, a side wall of the headrest support 12 at a portion around the protrusion 19 curves toward the inner peripheral side when the headrest stays 14 is not inserted. Also, as a result, a tip end T of the protrusion 19 is positioned farther toward the inner peripheral side than the outer peripheral surface of the cylindrical portion 16 at the portion where the bead 21 is formed, in the radial direction of the cylindrical portion 16.

FIGS. 4A to 4C are views of an assembly procedure of the headrest 13 of the headrest support structure of this example embodiment. As shown in FIG. 4A, when assembling the headrest 13, the headrest support 12 is first inserted into the bracket 11. The tip end T of the protrusion 19 at this time is positioned farther to the inner peripheral side than the outer peripheral surface of the cylindrical portion 16 at the portion where the bead 21 is formed. Also, the plate spring 22 at this time is flexed toward the inner peripheral side of the cylindrical portion 16 in response to it abutting against the inner peripheral surface of the bracket 11.

Then the headrest stay 14 is inserted into the headrest support 12, as shown in FIG. 4B. At this time, the bulging portion 25 on the back surface of the protrusion 19 is pushed on by the headrest stay 14, such that the protrusion 19 protrudes out toward the outer peripheral side of the cylindrical portion 16.

After the headrest stay 14 is inserted, the tip end T of the protrusion 19 that now protrudes out farther due to the headrest stay 14 being inserted, contacts the inner peripheral surface of the bracket 11. As a result, the headrest support 12 is supported by the bracket 11 in a manner that enables it to pivot in the seat front-rear direction around a contact portion between the tip end of the protrusion 19 that is provided on the outer peripheral surface of the headrest support 12, and the inner peripheral surface of the bracket 11.

Continuing on, the operation of the headrest support structure of this example embodiment structured as described above will now be described. As shown in FIG. 5A, a moment from the spring force of the plate spring 22 is applied to the headrest support 12. Therefore, the headrest support 12 when a load is not applied to the headrest stay 14 is still, in a position with both of the beads 21 and 24 abutting against the inner peripheral surface of the bracket 11.

As shown in FIG. 5B, when a load P1 toward the seat front F is applied to an upper portion of the headrest stay 14, the headrest support 12 pivots in a direction in which the end portion thereof on the seat lower D side is displaced toward the seat rear B, around the tip end T of the protrusion 19 that abuts against the inner peripheral surface of the bracket 11. Also, the plate spring 22 at this time flexes further toward the inner peripheral side in response to this pivoting. The bracket 11 at this time receives the load P1 applied to the headrest stay 14, via the plate spring 22. Therefore, the headrest 13 at this time is elastically supported via the plate spring 22.

As shown in FIG. 5C, when the load P1 becomes even larger and the headrest support 12 pivots such that an end portion E on the seat lower D side comes to be in a position in which it abuts against the inner peripheral surface of the bracket 11, the bracket 11 directly receives the load P1 applied to the headrest stay 14, at the inner peripheral surface thereof. Therefore, the headrest 13 at this time is rigidly supported.

On the other hand, as shown in FIG. 5D, when a load P2 toward the seat rear B is applied to the upper portion of the headrest stay 14, the headrest support 12 tries to pivot in a direction in which the end portion thereof on the seat lower D side is displaced toward the seat front F, around the tip end T of the protrusion 19. However, pivoting in this direction is restricted by both of the beads 21 and 24 abutting against the inner peripheral surface of the bracket 11. Therefore, the headrest 13 is rigidly supported from the beginning with respect to the load P2 toward the seat rear B.

Figure 6:
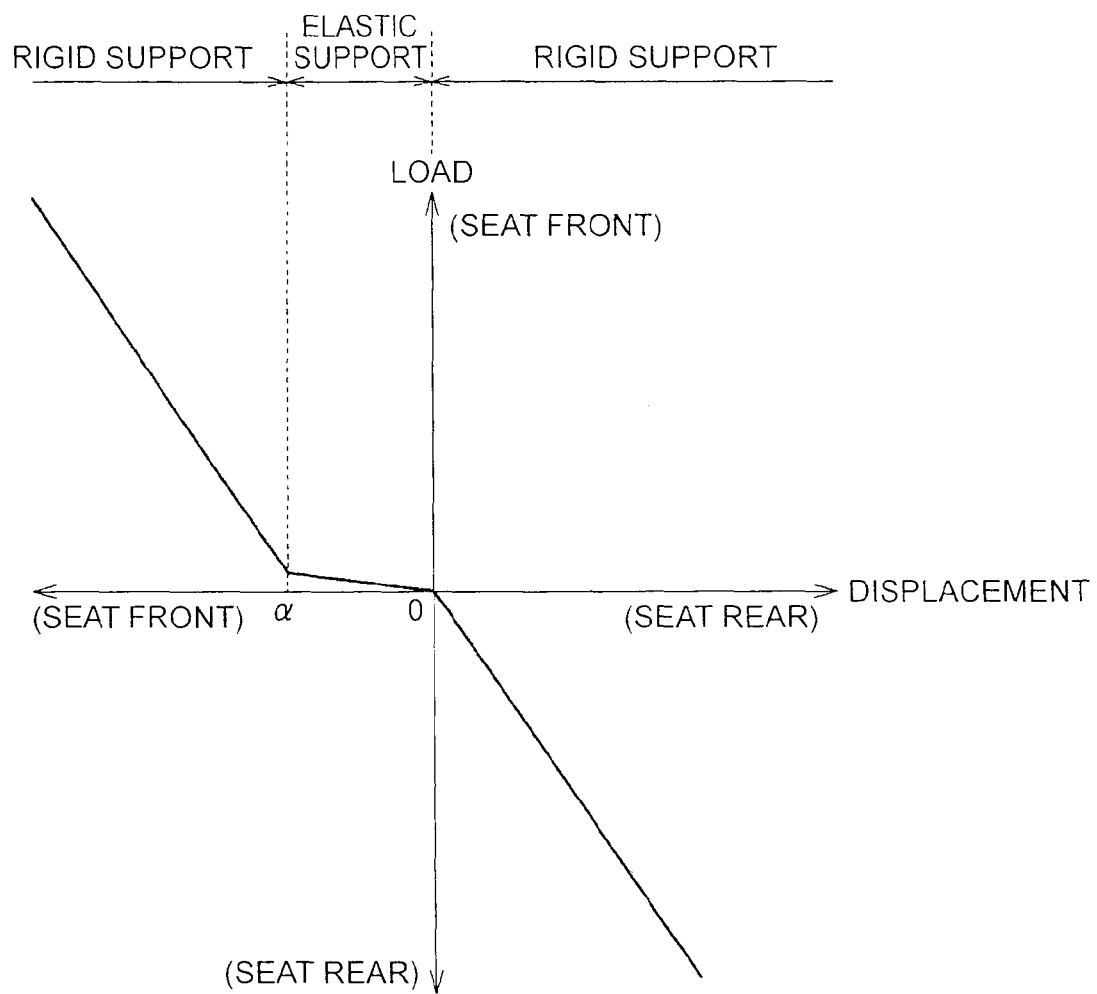
FIG. 6 is a graph showing the relationship between a load applied to the headrest and displacement of the headrest.

FIG. 6 is a view showing the relationship between the load applied to the headrest 13 and the amount of displacement of the headrest 13. As shown in the drawing, the headrest 13 is able to be displaced with respect to the seat front F by a relatively small load, until the end portion of the headrest support 12 comes to a position α where it abuts against the inner peripheral surface of the bracket 11. Therefore, with a seat employing the headrest support structure of this example embodiment, the headrest 13 is allowed to pivot ever so slightly with respect to the seat back, so the headrest 13 functions as a dynamic damper that reduces seat vibration.

With this headrest support structure, both the protrusion 19 of which the tip end T is the pivot center of the headrest 13 at this time, and the plate spring 22 that creates elastic reaction force with respect to this pivoting, are provided on the headrest support 12. Therefore, the damper property of the headrest support 12 is able to be easily and adequately set.

Meanwhile, the headrest 13 is rigidly supported from the beginning with respect to a load toward the seat rear B. Therefore, the headrest 13 that is supported by the headrest support structure of this example embodiment is able to adequately support the head of an occupant, while being able to pivot ever so slightly so as to function as a dynamic damper.

Furthermore, with the headrest support structure of this example embodiment as described above, the headrest 13 pivots ever so slightly around the contact portion between the tip end T of the protrusion 19 provided on the headrest support 12 and the inner peripheral surface of the bracket 11, while being elastically supported. In this case, if the tip end T of the protrusion 19 separates from the inner peripheral surface of the bracket 11 when the headrest 13 pivots, the position of the pivot center of the headrest 13 will become off, which will cause the damper property of the headrest 13 to change. Therefore, the fit of the tip end T of the protrusion 19 and the inner peripheral surface of the bracket 11 must be sufficiently tight to reliably maintain contact between the tip end T of the protrusion 19 and the inner peripheral surface of the bracket 11. However, if this fit is tight, the protrusion 19 will interfere with the inner peripheral surface of the bracket 11, making it difficult to insert the headrest support 12 when the headrest support 12 is to be inserted into the bracket 11.

Regarding this, in this example embodiment, the inner peripheral surface of the headrest support 12 when the headrest stay 14 is not inserted bulges out locally on the inner peripheral side at the location where the protrusion 19 is formed. As a result, the protrusion 19 is formed so as to protrude that much farther when the headrest stay 14 is inserted. In this example embodiment, the headrest support 12 is inserted into the bracket 11 in a state in which the tip end T of the protrusion 19 is recessed farther to the inner peripheral side than its original position. Therefore, interference from the protrusion 19 is able to be suppressed, so the headrest support 12 is able to be more smoothly inserted.

The headrest support structure of the example embodiment described above is able to yield the effects described below. (1) With the headrest support structure of the example embodiment, the headrest support 12 is pivotally supported with respect to the bracket 11, around the contact portion between the tip end T of the protrusion 19 provided on the outer peripheral surface of the headrest support 12, and the inner peripheral surface of the bracket 11. Therefore, the position of the pivot center of the headrest 13 is stabilized, so the pivot operation accuracy of the headrest 13, and thus the damper property of the headrest 13 that serves as a dynamic damper, is able to be more adequately set.

(2) With the headrest support structure of the example embodiment, the inner peripheral surface of the headrest support 12 when the headrest stay 14 is not inserted bulges out locally on the inner peripheral side of the headrest support 12 at the location where the protrusion 19 is formed. As a result, the protrusion 19 is formed so as to protrude farther toward the outer peripheral side of the headrest support 12 in response to the headrest stay 14 being inserted. Therefore, interference from the protrusion 19 with respect to the inner peripheral surface of the bracket 11 is inhibited, so the headrest support 12 is able to be more smoothly inserted.

(3) In this example embodiment, the two slits 20 provided in parallel are formed in the headrest support 12 so as to sandwich the protrusion 19. Therefore, the deformation of the headrest support 12 that acts to increase the amount that the protrusion 19 protrudes in response to the headrest stay 14 being inserted is able to be accomplished with even less force. Thus, the headrest stay 14 is also able to be smoothly inserted into the headrest support 12.

(4) In this example embodiment, the position of the tip end T of the protrusion 19 when the headrest stay 14 is not inserted is a position in which the tip end T of the protrusion 19 does not contact the inner peripheral surface of the bracket 11 when the headrest support 12 is inserted into the bracket 11 and the headrest stay 14 is not inserted. That is, a portion where the position of the outer peripheral surface in the radial direction will be farther to the outer peripheral side of the headrest support 12 than the tip end of the protrusion when the headrest stay 14 is not inserted, is provided on the outer peripheral surface of the inserted portion (i.e., the cylindrical portion 16) of the headrest support 12 on the side where the protrusion 19 is formed. Therefore, the headrest support 12 is able to be inserted into the bracket 11 without the tip end T of the protrusion 19 contacting the inner peripheral surface of the bracket 11, so this insertion is able to be performed even more smoothly.

The example embodiment may also be carried out modified as described below.—In the example embodiment described above, the two slits 20 are provided in parallel in the side surface of the cylindrical portion 16 of the headrest support 12 so as to sandwich the protrusion 19. If the headrest stay 14 is able to be inserted smoothly enough without providing the slits 20, the slits 20 may also be omitted.

In the example embodiment described above, the position of the tip end T of the protrusion 19 when the headrest stay 14 is not inserted is a position where the tip end T of the protrusion 19 will not contact the inner peripheral surface of the bracket 11 when the headrest support 12 is inserted into the bracket 11. Even if the tip end T of the protrusion 19 interferes somewhat with the inner peripheral surface of the bracket 11 when the headrest support 12 is inserted, an increase in sliding resistance when the headrest support 12 is inserted, due to contact between the protrusion 19 and the inner peripheral surface of the bracket 11, is able to be mitigated if the position of the tip end T of the protrusion 19 at this time is recessed farther to the inner peripheral side than the original position. Therefore, even if the position of the tip end T of the protrusion 19 when the headrest stay 14 is not inserted is not recessed to a position where the tip end T of the protrusion 19 does not contact the inner peripheral surface of the bracket 11, an increase in insertion resistance of the headrest support 12 from the formation of the protrusion 19 is able to be mitigated as long as the position of the tip end T of the protrusion 19 is farther to the inner peripheral side than the original position.

The positions of the protrusion 19 and the plate spring 22 on the headrest support 12 may be changed. For example, the headrest 13 is similarly able to be elastically supported even if the position of the protrusion 19 is switched with the position of the plate spring 22.

In the example embodiment described above, the plate spring 22 is made of metal as a spring to elastically support the headrest 13, but the plate spring 22 may also be made of other material. For example, the plate spring 22 may be made of the same resin as the cylindrical portion 16 and the head portion 17 of the headrest support 12. In this case, the plate spring 22 may also be integrally formed with the cylindrical portion 16.

The headrest support 12 may also be elastically supported by another type of spring, such as a coil spring or an elastic member (such as a rubber spacer), instead of the plate spring 22.

A plurality of springs that elastically support the headrest support 12 may also be provided. For example, the bead 24 may be omitted, and a spring may be provided on both the seat front F side and the seat rear B side of the side surface of the cylindrical portion 16. Also, a spring may be provided both above U and below D the protrusion 19 in the vertical direction of the seat.

A spring that elastically supports the headrest support 12 may be provided on the bracket 11 side.—In the example embodiment described above, the headrest 13 is elastically supported only with respect to minute displacement toward the seat front F side. For example, the pivot range of the headrest 13 where elastic support is performed may also be modified appropriately when necessary, e.g., the pivot range of the headrest 13 where elastic support is performed may be expanded toward the seat rear B side, or the headrest 13 may be elastically supported only with respect to minute displacement toward the seat rear B side.

In the example embodiment described above, a headrest support structure that makes the headrest 13 function as a dynamic damper is formed. In another case, the headrest may be pivotally supported by the seat back. In this case as well, the position of the pivot center of the headrest is able to be stabilized if the headrest support is pivotally supported with respect to the bracket, around the contact portion between the inner peripheral surface of the bracket and the tip end of the protrusion provided on the outer peripheral surface of the headrest support. Also, if a protrusion is formed so that the protrusion amount to the outer peripheral side of the headrest support increases in response to the headrest stay being inserted, interference from the protrusion with respect to the inner peripheral surface of the bracket when the headrest support is inserted is able to be inhibited, so the headrest support is able to be inserted more smoothly.

The invention claimed is:

1. A headrest support structure comprising:
a headrest support having a hollow cylindrical shape, into which a headrest stay is inserted; and
a bracket having a hollow cylindrical shape that is fixed to a seat back frame, and into which the headrest support is inserted, wherein
the headrest support is pivotally supported with respect to the bracket, around a contact portion between a tip end of a protrusion provided on a seat front side of the headrest support and an inner peripheral surface of the bracket;
the protrusion is formed such that a protrusion amount thereof toward an outer peripheral side of the headrest support increases in response to insertion of the headrest stay;
a protruding bead, which is opposed to the protrusion, is formed on a seat rear side of the headrest support.

2. The headrest support structure according to claim 1, wherein
the headrest support is formed to include two slits provided in parallel so as to sandwich the protrusion.

3. The headrest support structure according to claim 1, wherein a position of the tip end of the protrusion when the headrest stay is not inserted is a position in which the tip end of the protrusion does not contact the inner peripheral surface of the bracket when the headrest support is inserted into the bracket and the headrest stay is not inserted.

4. The headrest support structure according to claim 1, further comprising:
an elastic member provided on the headrest support, the elastic member elastically supporting a headrest via the headrest stay.

5. A headrest support structure comprising:
a headrest support having a hollow cylindrical shape, into which a headrest stay is inserted; and
a bracket having a hollow cylindrical shape that is fixed to a seat back frame, and into which the headrest support is inserted, wherein
the headrest support is pivotally supported with respect to the bracket, around a contact portion between a tip end of a protrusion provided on a seat front side of the headrest support and an inner peripheral surface of the bracket;
an inner peripheral surface of the headrest support when the headrest stay is not inserted locally bulges out toward an inner peripheral side of the headrest support, at a location where the protrusion is formed;
a protruding bead, which is opposed to the protrusion, is formed on a seat rear side of the headrest support.

6. The headrest support structure according to claim 5, wherein
the headrest support is formed to include two slits provided in parallel so as to sandwich the protrusion.

7. The headrest support structure according to claim 5, wherein a position of the tip end of the protrusion when the headrest stay is not inserted is a position in which the tip end of the protrusion does not contact the inner peripheral surface of the bracket when the headrest support is inserted into the bracket and the headrest stay is not inserted.

8. The headrest support structure according to claim 5, further comprising:
an elastic member provided on the headrest support, the elastic member elastically supporting a headrest via the headrest stay.

9. A headrest support structure comprising:
a headrest support having a hollow cylindrical shape, into which a headrest stay is inserted; and
a bracket having a hollow cylindrical shape that is fixed to a seat back frame, and into which the headrest support is inserted, wherein
the headrest support is pivotally supported with respect to the bracket, around a contact portion between a tip end of a protrusion provided on a seat front side of the headrest support and an inner peripheral surface of the bracket;
the protrusion is formed such that a protrusion amount thereof toward an outer peripheral side of the headrest support increases in response to insertion of the headrest stay;
a protruding bead, which is opposed to the protrusion, is formed on a seat rear side of the headrest support,
wherein the headrest support is formed to include two slits provided in parallel so as to sandwich the protrusion.

* * * * *